United States Patent [19]
Hoff et al.

[11] Patent Number: 5,337,314
[45] Date of Patent: Aug. 9, 1994

[54] WIRELESS FACSIMILE COMPUTER SLATE

[75] Inventors: Don G. Hoff, Tiburon, Calif.; Lawrence H. Ragan, Richardson, Tex.

[73] Assignees: Seiko Corp.; Seiko Epson Corp., both of Japan

[21] Appl. No.: 979,743

[22] Filed: Nov. 23, 1992

Related U.S. Application Data

[63] Continuation of Ser. No. 515,810, Apr. 27, 1990, Pat. No. 5,166,932.

[51] Int. Cl.⁵ .............................................. H04G 7/02
[52] U.S. Cl. ................................... 370/94.1; 370/95.1; 370/110.1; 340/825.44; 455/32.1
[58] Field of Search ................. 370/95.1, 95.3, 85.9, 370/110.1, 79, 94.1, 94.2, 60, 60.1; 358/147; 340/825.44, 825.47; 455/32.1

[56] References Cited

U.S. PATENT DOCUMENTS

| | | | |
|---|---|---|---|
| 4,665,519 | 5/1987 | Kirchner et al. | 370/95.3 |
| 4,750,036 | 6/1988 | Martinez | 358/147 |
| 4,807,222 | 2/1989 | Amitay | 370/85.9 |
| 5,005,013 | 4/1991 | Tsukamoto et al. | 340/825.44 |

*Primary Examiner*—Wellington Chin
*Attorney, Agent, or Firm*—Elmer Galbi

[57] ABSTRACT

A radio paging network transmits non-paging data, such as facsimile images, to lap top computer receivers by formatting the data into a series of packets and interleaving these packets, on a space available basis, into the paging signal.

5 Claims, 5 Drawing Sheets

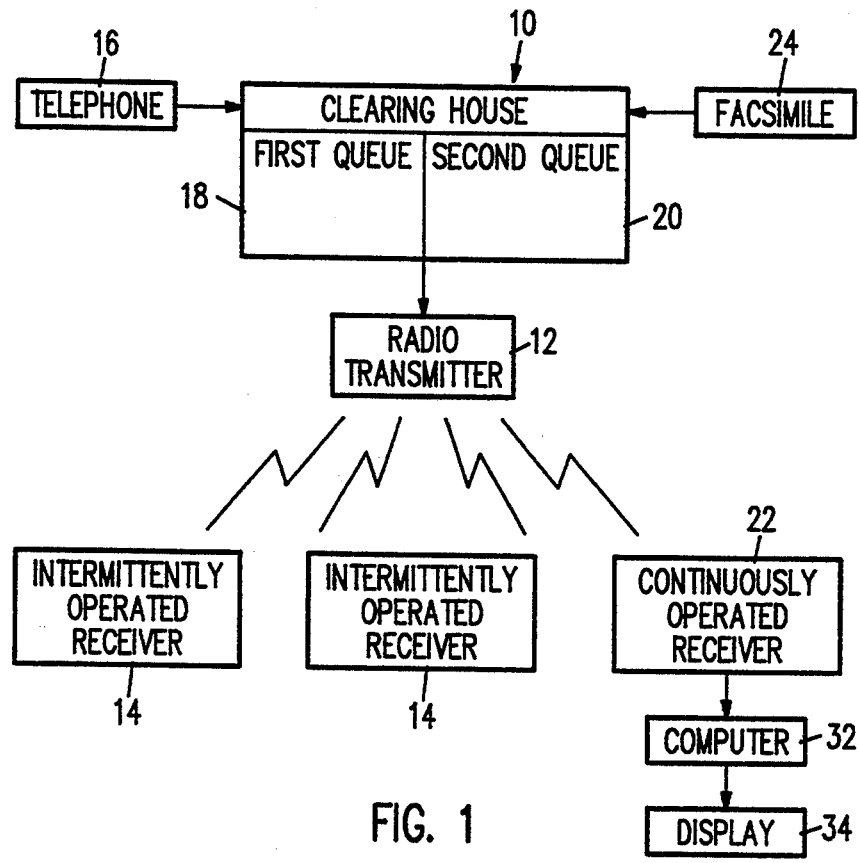
FIG. 1
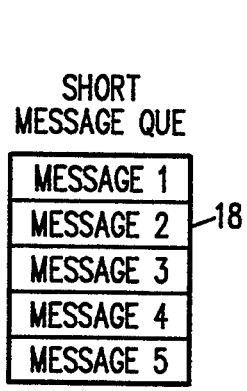
FIG. 2
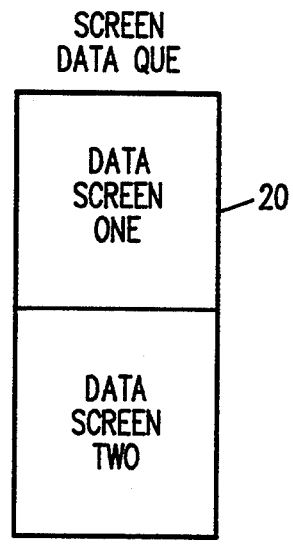
FIG. 3
| TIME SLOT NUMBER | RECIPIENT IDENTIFIER | MESSAGE TYPE | MESSAGE DATA |
FIG. 6

WIRELESS FACSIMILE COMPUTER SLATE

This is a continuation of application Ser. No. 07/515,810 filed Apr. 27, 1990, now U.S. Pat. No. 5,166,932.

FIELD OF THE INVENTION

The present invention relates to wireless communication systems, and more particularly relates to a packet-based radio paging network wherein lengthy streams of non-paging data, such as facsimile images, can be formatted into packets and interleaved, on a time available basis, into the paging signal.

BACKGROUND OF THE INVENTION

A variety of radio paging devices and protocols are presently utilized in commercial paging networks. None of the known networks combines in one protocol individually addressable time slots intended for periodically active paging receivers, together with individually addressable time slots intended for continuously active receivers which receive long data messages.

U.S. Pat. No. 4,713,808 describes a high capacity time slot radio paging protocol (the "Gaskill protocol") comprising packets of information, each of which includes a receiver identification code and a message code. The packets are transmitted using subcarriers of conventional FM broadcast signals and are received using wrist mounted receiving devices.

U.S. Pat. No. 4,897,813 describes a paging system in which a series of time slots identify succeeding time slots that contain information for particular receivers.

The size and power requirements of the circuitry required to implement personal computers have decreased to such an extent that lap top portable personal computers are now in widespread use. Such lap top computers generally include all the normal personal computer functions and they generally include an LCD display.

SUMMARY OF THE INVENTION

The present invention combines high speed pager technology and lap top computer technology and to provide a wireless facsimile. The present invention combines in one network periodically active individually addressable pager receivers and continuously active individually addressable lap top computer receivers. The result is a highly efficient network which operates on a time slot basis for transmitting paging messages and in a non time slot mode for transmitting messages to lap top computers.

Pager networks are generally designed to handle the peak traffic load expected. Even when operating a peak load, such networks generally have some unused time slots. In one form of the present invention, the unused time slots in a time slot pager protocol are used to transmit screens of data to a modified lap top-like computer device.

In one embodiment of the invention, the message transmitting clearinghouse maintains two message queues. One queue is for short paging messages and the other queue is for relatively long screen or facsimile data messages. At the beginning of each time period, the short message queue is interrogated and if short messages are waiting, these are formatted for transmission. Time slots not filled with paging messages are then made available to carry screen or facsimile data messages.

Both paging and screen or facsimile type data packets have a receiver identification code and a message type code, in addition to a message data field. The message type code indicates whether the data in the associated message data field is a pager message or screen data.

The wrist mounted paging receivers are only periodically active, whereas the lap top computer receivers, with their large readily rechargeable batteries, are continuously active. Since the lap top computer receivers are continuously active, any series of time slots in one or more message frames can be used to convey screen data thereto. The lap top computer receiver determines, from examination of the transmitted receiver identification code and message type code, whether the time slot contains screen data for that computer. Data in other time slots is ignored.

The foregoing and additional features and advantages of the present invention will be more readily apparent from the following detailed description thereof, which proceeds with reference to the accompanying drawings.

BRIEF DESCRIPTION OF THE DRAWINGS

FIG. 1 is a diagram of a radio paging network according to one embodiment of the present invention.

FIG. 2 is a diagram of a short message queue used in the paging network of FIG. 1.

FIG. 3 is a diagram of a screen data queue used in the paging network of FIG. 1.

FIG. 6 is a diagram illustrating the formatting of a single time slot.

DETAILED DESCRIPTION

Figure 4:
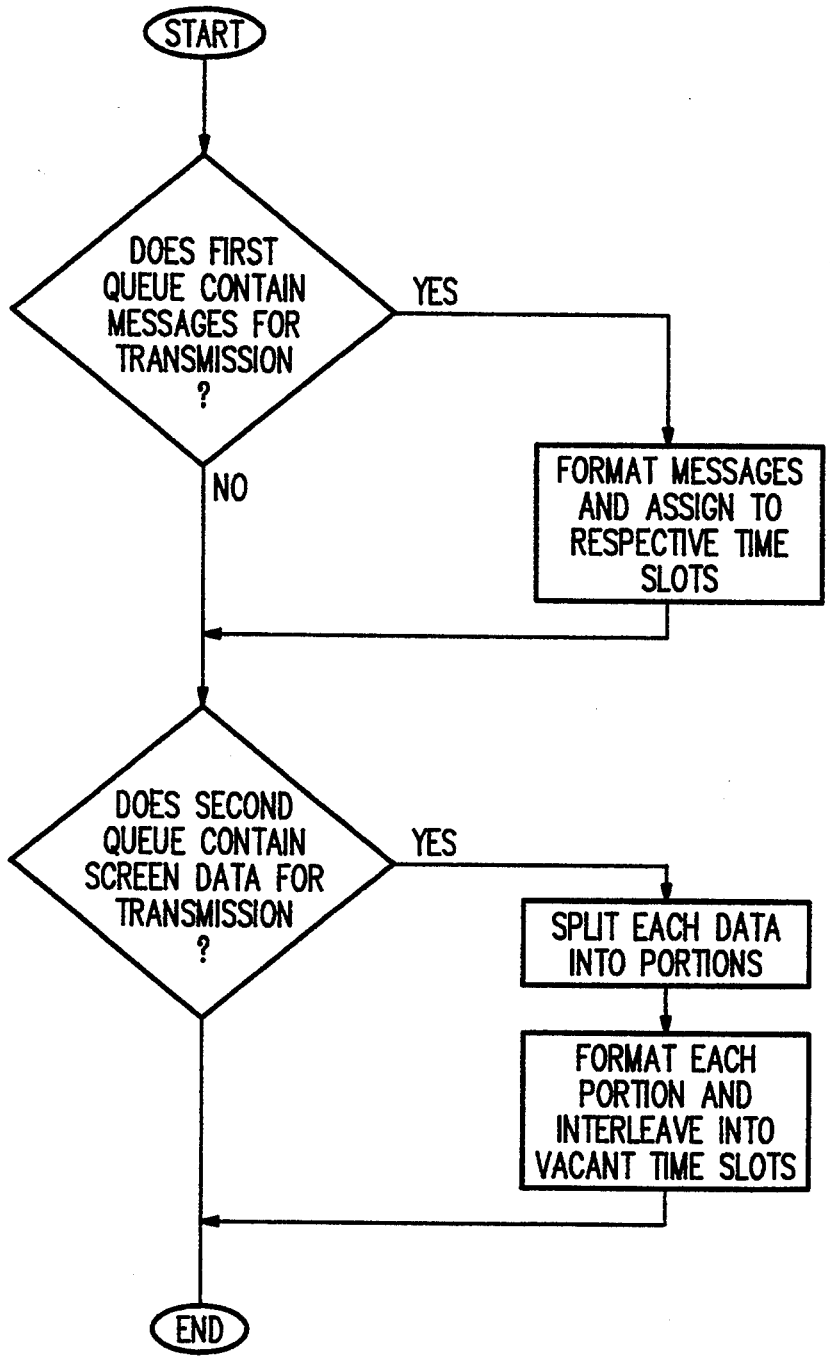
FIG. 4 is a flow chart illustrating one method by which the paging network of FIG. 1 can interleave short paging messages and long screen data.

For expository convenience, the present invention is illustrated with reference to the paging system disclosed in the above-referenced Gaskill patents. It will be recognized, however, that the invention finds applicability in connection with any paging system.

Referring first to FIG. 1, the basic Gaskill paging network includes a clearinghouse 10, a radio transmitter 12, and a plurality of intermittently operated paging receivers 14. To transmit a page, a user first dials the clearinghouse using a telephone 16. A voice synthesizer at the clearinghouse provides voice prompts instructing the user to enter the message and the identity of the addressee on the phone's Touch Tone pad. Messages provided to the clearinghouse in this manner are accumulated in a queue 18 (FIG. 2). The clearinghouse formats messages from this queue into a time slot protocol and provides the formatted data to the transmitter 12. The transmitter modulates and transmits this data on the subcarrier of an FM broadcast signal.

The intermittently operated receivers 14 are wristwatch receivers that energize for a few milliseconds every few minutes to determine whether the time slot they have been programmed to monitor contains a message with their identifier code. If so, the receiver remains energized long enough to receive the associated message before deenergizing again. The message is then displayed to the recipient on the face of the wristwatch.

In accordance with the present invention, the clearinghouse maintains a second queue 20 (FIG. 3) in addition to the first. The second queue is dedicated to non-paging data (hereinafter "screen data") that is to be forwarded, through the paging system, to one or more continuously powered receivers 22. Data in the second queue may correspond to bit mapped graphic images, such as data from a facsimile machine 24 or from the frame buffer of a computer display, or it may be coded, such as textual data represented in ASCII. To service this data in the second queue, the clearinghouse uses time slots in the transmission protocol that would otherwise be left vacant.

Figures 5, 7:
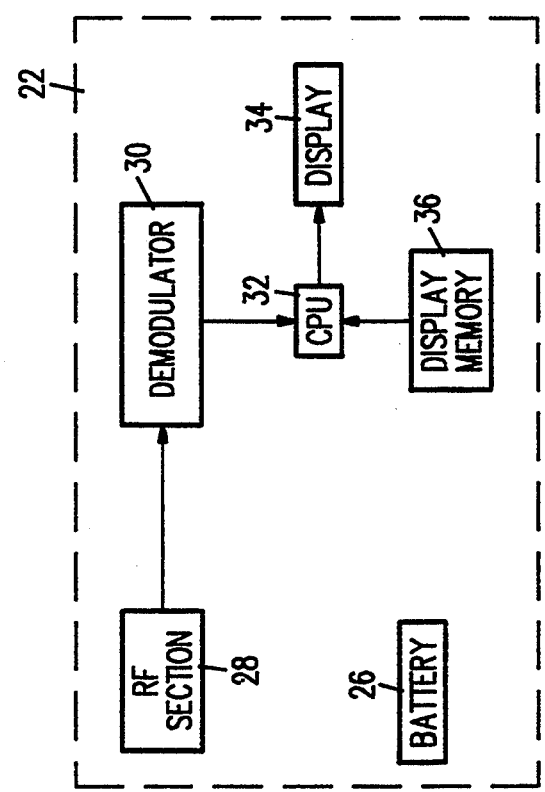
FIG. 5 is an illustration of a series of time slots in a transmission protocol used by the paging network of FIG. 1, showing the interleaving of paging messages and screen data.
FIG. 7 is a block diagram of a lap top computer receiver that may be used in the radio paging network of FIG. 1.

The Gaskill data transmission protocol is organized into time units termed frames, which in turn are divided into subframes, and further divided into time slots. At the beginning of each frame, the clearinghouse polls the first queue to determine whether it contains any messages for transmission. These messages are formatted and are assigned to particular subframes and time slots, as determined by the identifier codes of the intended recipients. After messages from the first queue have been assigned to their respective time slots, the remaining time slots are flagged as free and made available to transmit data from the second queue. The clearinghouse then polls the second queue and splits any screen data therein into portions sized for formatting into packets. These data portions are then formatted and interleaved into vacant time slots in the protocol. This procedure is illustrated in FIG. 4, and a fragment of a frame including interleaved message and paging data is illustrated in FIG. 5. The interleaving of message data and screen data is desirably accomplished in such a manner as to not materially degrade the message latency experienced by paging subscribers. In other words, screen data is a secondary service to conventional paging messages and is inserted into the transmission protocol on a time-available bases.

Data can be assigned from the second queue into vacant time slots in the protocol in a number of fashions. In the preferred embodiment, the clearinghouse attempts to minimize fragmentation of the data by employing long blocks of contiguous vacant time slots for correspondingly long strings of screen data, and short contiguous blocks of vacant slots for shorter strings. In this respect, allocation of time slot resources in the present paging system is similar to dynamic allocation of memory resources in a computer, and similar resource management techniques can be used.

Each time slot in the Gaskill system is formatted with a number of fields, as shown in FIG. 6. Only one field carries message data. Others carry coding that indicates (a) the time slot number; (b) the recipient; and (c) the type of data included in the message data field. This latter field, eight bits long, is used to indicate when the associated message data is screen data from the second queue. Screen data is typically quite lengthy. Consequently, each string of screen data must be broken into several portions for transmission, and these portions must later be reassembled at the targeted receiver 22. In an illustrative embodiment, the targeted receiver is not instructed in advance which time slots contain screen data. Rather, the receiver monitors all time slots for its identifier code and collects the associated screen data in a memory. This process continues until an end-of-data code is encountered in the message field, at which time the accumulated data is provided to a frame buffer for display on an associated LCD screen.

In other embodiments, the receiver knows in advance which time slots contain screen data addressed thereto, either by reference to an index list transmitted before the data, or by daisy chain pointers in each time slot of screen data that point to the next time slot in the series.

In the preferred form of the invention, the continuously powered receivers 22 take the form of lap top computers. Referring to FIG. 7, each such receiver 22 includes a battery 26, an RF section 28, a demodulator 30, a CPU 32, and a display 34. The RF section 28 is conventional and includes an antenna and tuning/amplification circuits for receiving the desired FM broadcast signal. A suitable receiver is shown in U.S. Pat. No. 4,885,802. The demodulator 30 demodulates the data subcarrier of the FM broadcast signal and provides a stream of digital data to the CPU 32. U.S. Pat. No. 4,893,341 shows a suitable demodulator. The CPU processes the data stream to detect its identifier code. If the CPU detects its identifier code among the demodulated data stream, it adds the message data associated therewith, in bit map mode, to a display memory 36. A memory large enough to store several pages of text and/or graphics is desirable. This allows participants in a remote conference to recall past pages for display.

Figure 8:
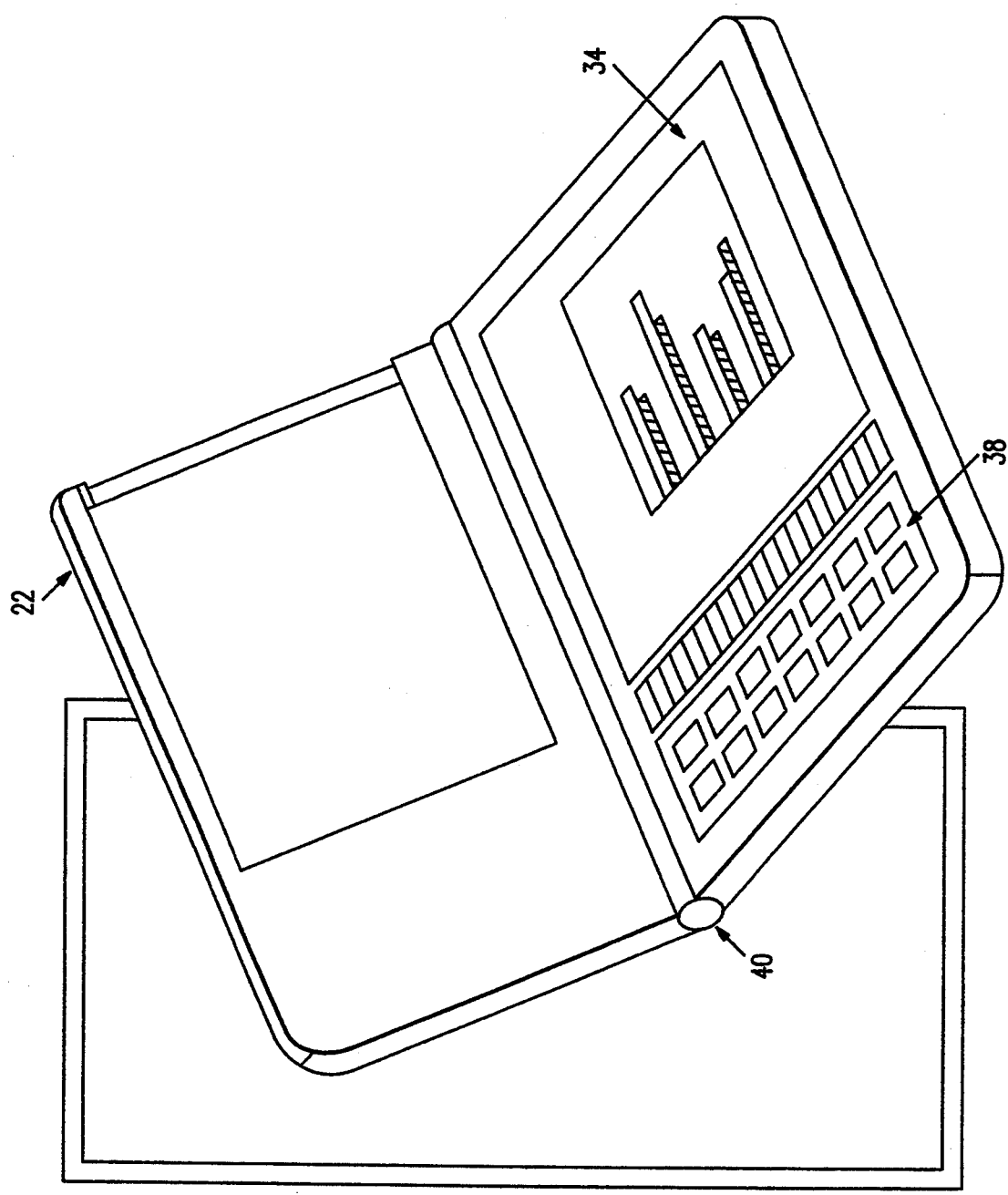
FIG. 8 is an illustration of a lap top computer receiver that may be used in the radio paging network of FIG. 1.

FIG. 8 is an illustration of a preferred form of lap top computer receiver 22, referred to herein as a "slate." As can be seen, the slate lacks a keyboard and has instead a control panel 38 adjacent a large backlit LCD display 34. This control panel provides for selection of data entry (by an associated light pen), screen erase, screen receive, screen memory scroll, print, and other functions. A port 40 on the side of the unit permits attachment of a printer for providing hard copies of any received images.

Figure 9:
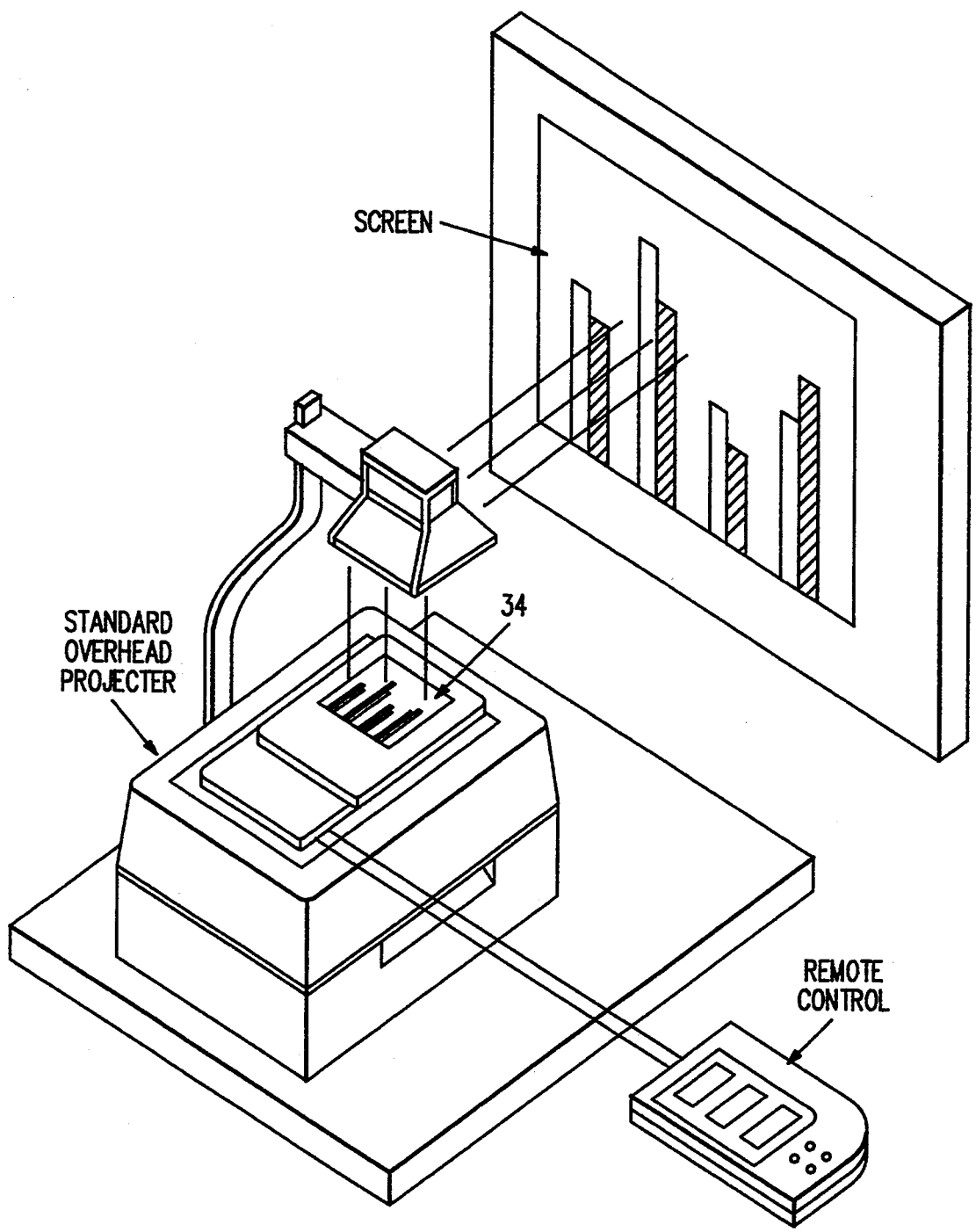
FIG. 9 is an illustration of an apparatus by which screen data received by the lap top computer receiver of FIG. 8 may be displayed to a large number of viewers.

While the slate 22 of FIG. 8 is ideally suited for most applications in which a person wants instant access to graphical or facsimile data without being constrained to an office, the LCD display 34 is not well adapted for viewing by large groups. According to another aspect of the present invention, if screen data relayed to the slate is to be presented to a large group, the unit can be converted into an "electronic transparency." In such conversion, backlighting elements disposed behind the LCD panel 34 are snapped out of the slate's molded plastic case and a plate of clear glass provided with an infrared-reflective thin film is substituted therefor. The unit so modified can be placed on a conventional overhead projector and used to project any image displayed on the LCD panel onto a large screen for viewing by large audiences. This use of the modified slate is illustrated in FIG. 9.

Electronic transparency technology, both color and black and white, is well known and is illustrated, inter alia, in U.S. Pat. No. 4,917,465 and European patent publication EP 355,627.

A typical 480×640 black and white display panel requires 480×640 (307,200) bits of data. If this data is transmitted in ASCII format (eight bits per character), 38,400 characters must be sent. At a typical paging network throughput of 562 ASCII message characters per second, a single screen requires approximately 68 seconds to display.

If, instead of full bit-mapped graphics, the display panel is used to display up to 43 lines of 80 textual characters, a single screen requires approximately 6 seconds to display, a tenfold increase over graphics mode. By employing text mode when possible, a significant increase in display throughput can be achieved. (Both the 68 and 6 second figures can be reduced substantially by use of standard data compression techniques.)

If resolution of the transmitted screen data exceeds that of the available display device, a format conversion algorithm can be used to convert the high resolution image to a lower resolution image suitable for display. Alternatively, the high resolution image can be displayed in portions on the lower resolution display.

Having described and illustrated the principles of our invention with reference to a preferred embodiment, it will be apparent that the invention can be modified in arrangement and detail without departing from such principles. For example, while the invention has been illustrated with reference to facsimile image data, the data may be of a number of different types. For example, data from an "electronic pencil" used in conjunction with an input panel, as shown in Nakano, et al, "A New LCD with an Input Function Using Conventional Electrodes for Both Display and Input," IEEE Trans. on Consumer Electronics, Vol. CE-33, No. 3, August, 1987, pp. 367–373, can be used. Alternatively, the data may be entered conventionally using the keyboard of a personal computer.

Similarly, while the invention has been illustrated with reference to a methodology in which all paging messages pending in the first queue are serviced before any data from the second queue, in other methodologies this need not be the case. For example, the clearinghouse may defer formatting paging messages from the first queue into the time slot protocol until a threshold number of paging messages are accumulated. In the interim, the protocol can be dedicated to transmission of screen data, thereby assuring availability of long contiguous blocks of vacant time slots. (Human factor considerations suggest that, while paging subscribers expect prompt message transmission, the system need not respond instantly to every request, thereby permitting selective servicing of the first queue to simplify screen data transmission.) In still another methodology, the clearinghouse isolates frames of paging messages from frames of screen data by transmitting screen data from the second queue only if the first queue is found to be empty.

In view of the many possible embodiments, methodologies and applications to which the principles of our invention may be put, it should be recognized that the detailed system is illustrative only and should not be taken as limiting the scope of my invention. Rather, we claim as our invention all such systems as may come within the scope and spirit of the following claims and equivalents thereto.

We claim:

1. A message transmission system that includes in combination,
radio transmission means for transmitting messages utilizing a time slot protocol, each message having as a part thereof first indicia designating the intended receiver of said message, and second indicia indicating a message type, said types including a first type message and a second type of message,
a plurality of intermittently operated radio paging receivers, each of which has an associated first indicia, and means for receiving messages transmitted by said transmission means which include the first indicia associated with said receiver, and an indicia indicating a first type of message,
a plurality of lap top computers, each particular one of said lap top computers having an associated first indicia, and means for receiving messages transmitted by said transmission means which include the first indicia associated with said particular lap top computer and an indicia indicating a second type of message.

2. The system recited in claim 1 wherein the transmissions by said transmission means includes a time slot number in each time slot, and wherein each particular one of said paging receivers has an assigned time slot and each paging receiver is periodically active during a particular time slot, whereby if a receiver is activated during a time slot other than the time slot assigned to said particular receiver, the receiver can calculate the time to the time slot assigned to said particular receiver.

3. A message transmission system that includes in combination,
radio transmitter means for transmitting messages, each message having indicia designating an intended receiver and data,
a plurality of radio paging receivers, each particular one of said radio paging receivers having an associated receiver indicia, and means for receiving transmitted messages which include the indicia associated with the particular receiver,
a plurality of lap top computers each of which includes a radio paging receiver, each particular one of said lap top computers having an associated receiver indicia, and means for receiving transmitted messages which include the indicia associated with the particular lap top computer.

4. The system recited in claim 3 wherein the transmissions by said transmission means include a time slot number in each time slot, and wherein each of particular one of said paging receivers has an assigned time slot and each paging receiver is periodically active during a particular time slot, whereby if a receiver is activated during a slot other than the time slot assigned to said particular receiver, the receiver can calculate the time to the time slot assigned to said particular receiver.

5. A radio paging method that utilizes radio paging receivers, each of which has a recipient identifier code, said method including the steps of:
providing a plurality of paging messages each message having a recipient identifier code and a message type code therein, said message type code differentiating a first type of message from a second type of message;
transmitting said paging messages in a time slot message format;
periodically energizing paging receivers to receive said first type of messages having recipient identifier codes corresponding thereto;
providing a data stream;
splitting said data stream into a plurality of portions and transmitting said portions as a series of messages each of which has a code indicating said second type of message, each message being sent in a different time slot;
providing a continuously energized receiver;
receiving said series of data portions using said continuously energized receiver; and
reassembling said portions into a data stream.

* * * * *